(12) United States Patent
Bruss et al.

(10) Patent No.: US 11,981,277 B2
(45) Date of Patent: May 14, 2024

(54) PANEL, INTEGRATED STRUCTURE, AND METHOD

(71) Applicant: SABIC GLOBAL TECHNOLOGIES B.V., Bergen op Zoom (NL)

(72) Inventors: Erhard Bruss, Remagen (DE); Tamara Marijke Eggenhuisen, Breda (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 508 days.

(21) Appl. No.: 16/652,295

(22) PCT Filed: Nov. 20, 2018

(86) PCT No.: PCT/IB2018/059135
§ 371 (c)(1),
(2) Date: Mar. 30, 2020

(87) PCT Pub. No.: WO2019/102349
PCT Pub. Date: May 31, 2019

(65) Prior Publication Data
US 2020/0298778 A1    Sep. 24, 2020

(30) Foreign Application Priority Data
Nov. 24, 2017   (EP) ..................... 17203445

(51) Int. Cl.
*B60R 19/52* (2006.01)
*B29C 45/00* (2006.01)
(Continued)

(52) U.S. Cl.
CPC .......... *B60R 19/52* (2013.01); *B29C 45/0001* (2013.01); *B60R 19/023* (2013.01);
(Continued)

(58) Field of Classification Search
CPC ... B60R 19/52; B60R 19/023; B29C 45/0001; C08L 69/00
(Continued)

(56) References Cited

U.S. PATENT DOCUMENTS

2007/0129482 A1* 6/2007 Kuvshinnikova .... C08K 5/0041
524/500
2009/0136730 A1* 5/2009 Nakano ................. C08K 3/38
428/335

(Continued)

OTHER PUBLICATIONS http://press.covestro.com/news.nsf/id/Trendy-Exterior-Design-for-Electric-Cars; Mar. 23, 2017.
(Continued)

*Primary Examiner* — Tahseen Khan
(74) *Attorney, Agent, or Firm* — CANTOR COLBURN LLP

(57) ABSTRACT

A panel for a vehicle is described. The panel includes a substrate and a hardcoat layer on a surface of the substrate configured as a vehicle front-facing surface. The panel includes a first portion having a visible light transmission equal to or greater than 40% measured in accordance with ASTM D1003-00. The substrate includes a polymer composition comprising polycarbonate. A melt volume rate of the polycarbonate is equal to or less than 15 cm3/10 min, measured at 300° C. with a 1.2 kg load in accordance with ISO1133.

20 Claims, 3 Drawing Sheets

(51) Int. Cl.
    *B60R 19/02*     (2006.01)
    *C08L 69/00*     (2006.01)
    *B29K 69/00*     (2006.01)
    *B29K 105/00*     (2006.01)
    *B29L 31/30*     (2006.01)

(52) U.S. Cl.
    CPC .......... C08L 69/00 (2013.01); *B29K 2069/00* (2013.01); *B29K 2105/0044* (2013.01); *B29L 2031/30* (2013.01); *C08L 2205/025* (2013.01); *C08L 2205/03* (2013.01)

(58) Field of Classification Search
    USPC .......................................................... 428/220
    See application file for complete search history.

(56) References Cited

U.S. PATENT DOCUMENTS

| | | | | |
|---|---|---|---|---|
| 2012/0252961 | A1* | 10/2012 | Sybert | C08K 5/109 525/464 |
| 2013/0323476 | A1* | 12/2013 | Farrell | B29C 66/41 428/195.1 |
| 2014/0370213 | A1* | 12/2014 | van der Mee | C08L 83/04 524/126 |
| 2015/0104599 | A1 | 4/2015 | Van Der Mee et al. | |
| 2016/0222191 | A1 | 8/2016 | Sharifi | |
| 2017/0210882 | A1* | 7/2017 | Sharifi | C08K 5/1345 |

OTHER PUBLICATIONS https://www.mercedes-benz.com/en/mercedes-benz/next/e-mobility/concept-eq-mobility-revisited—Mercedes-Benz Concept EQ: The Electric SUV of the Future; Jul. 10, 2017.

https://www.mercedes-benz.com/wp-content/uploads/sites/3/2016/09/14-Mercedes-Benz-Innovation-E-Mobility-Showcar-Generation-EQ Paris Motor Show, 2016.

International Search Report; International Application No. PCT/IB2018/059135; International Filing Date: Nov. 20, 2018; dated May 20, 2019; 7 pages.

Written Opinion; International Application No. PCT/IB2018/059135; International Filing Date: Nov. 20, 2018; dated May 20, 2019; 8 pages.

China Office Action and Search Report for China Application No. 2018800758701; Application Filing Date: Nov. 20, 2018, Action: dated Jul. 19, 2021, 20 pages, with English Translation.

* cited by examiner

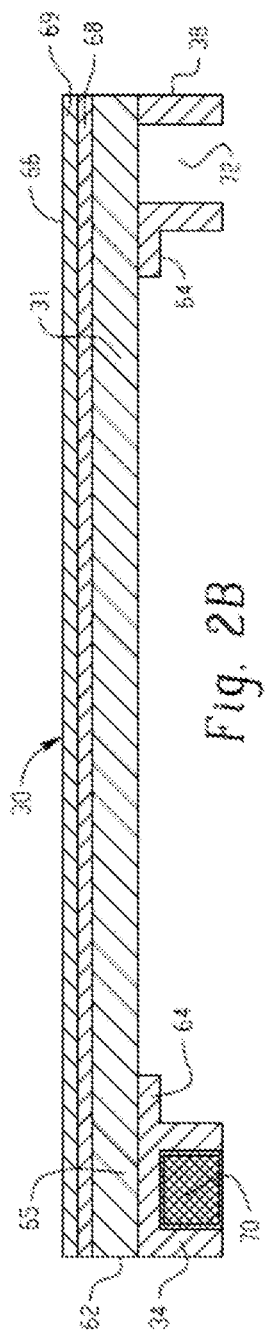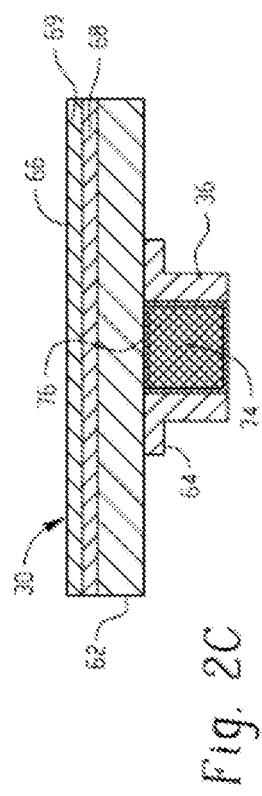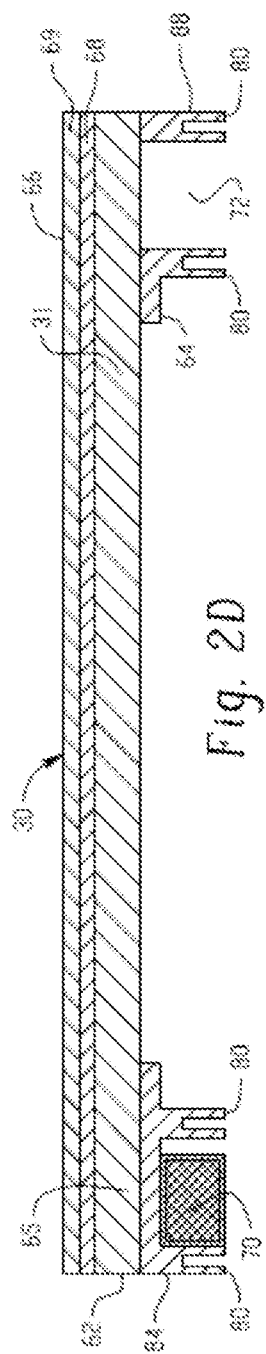

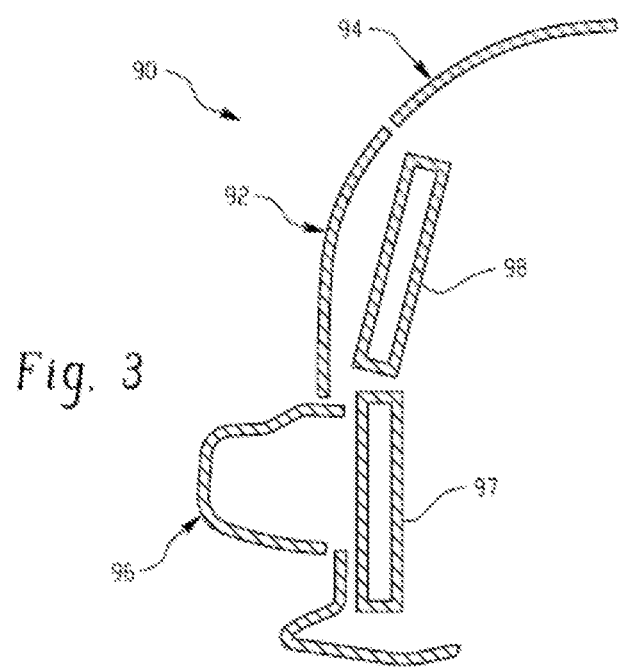

PANEL, INTEGRATED STRUCTURE, AND METHOD

This application is a National Stage application of PCT/IB2018/059135, filed Nov. 20, 2018, which claims the benefit of European Application No. 17203445.6, filed Nov. 24, 2017, both of which are incorporated by reference in their entirety herein.

In current vehicles (e.g., electric vehicles), parts such as the grill can be superfluous and new parts can be used instead. In particular, a grill can be superfluous if introduction of cold air under a hood including a gasoline engine is not needed. The grill can be replaced with a panel (e.g., front panel), depending on the Critical to Quality (CTQ) characteristics of the panel.

However, due to molding issues, forming plastic panels of a desired dimension can be problematic, as the plastic panels are generally thick (e.g., greater than 5 millimeters (mm) thick), have poor impact properties, and display brittle failure. Panels with thicknesses less than 5 mm can have ductile behavior, but require complex manufacturing techniques (such as compression molding, multiple gating, or sequential gating during molding). Though conventional molding techniques (e.g., injection molding) can be used to produce panels with thicknesses less than 5 mm, a higher flow material is needed. However, use of such a material results in loss of ductility after application of a protective hardcoat layer to the panels.

Thus, it would be desirable to provide improved panels for vehicles, particularly materials for producing panels satisfying various CTQ characteristics.

US 2015/104599 is directed to a thermoplastic composition comprising a poly(carbonate-arylate ester); and an organophosphorus compound in an amount effective to provide 0.1 to 1.0 wt % of phosphorus based on the total weight of the composition, wherein an article molded from the composition has a smoke density after four minutes (Ds-4) of less than or equal to 300 determined according to ISO 5659-2 on a 3 millimeter (mm) thick plaque, and a maximum average rate of heat release emission (MAHRE) of less than or equal to 90 kW/m$^2$ determined according to ISO 5660-1 on a 3 mm thick plaque.

US 2014/370213 is directed to an aircraft component formed from a thermoplastic polymer composition comprising, 90 to 97.5 wt. % of a poly(carbonate-arylate ester); 2.5 to 10 wt. % of an aromatic organophosphorus compound such as BPADP or RDP; and optionally, up to 5 wt. % of an additive composition. A sample of the thermoplastic composition has an OSU integrated 2 minute heat release test value of less than 65 kW-min/m$^2$ and a peak heat release rate of less than 65 kiloWatts per square meter (kW/m$^2$), each measured using the method of FAR F25.4, in accordance with FAR 25.853 (d) at a thickness of 1.5 or 3 mm, an E662 smoke test DsMax value of less than 200 when measured at a thickness of 1.5 mm or 3 mm, a flame time of less than 15 seconds, a burn length of less than 6 inches, and a drip extinguishing time of less than 5 seconds, each measured using the method of FAR F25.5.

A panel for a vehicle includes a substrate and a hardcoat layer on a surface of the substrate configured as a vehicle front-facing surface. The substrate includes a polymer composition comprising polycarbonate. A melt volume rate of the polycarbonate is equal to or less than 15 cubic centimeters per 10 minutes (cm$^3$/10 min), measured at 300° C. with a 1.2 kilogram (kg) load in accordance with ISO1133. A width of the panel is equal to or greater than 450 mm, or 450 mm to 1,400 mm, preferably 500 mm to 1,200 mm. A height of the panel is equal to or greater than 300 mm. A thickness of the panel is equal to or less than 5 mm, or equal to or less than 4.5 mm, preferably 1.5 mm to 4.5 mm.

An integrated structure for a vehicle includes the above described panel and a bumper connected to the panel.

A vehicle includes the above described panel or the above described integrated structure.

Use of a polymer composition includes forming a substrate of a panel of a vehicle. The polymer composition includes polycarbonate. A melt volume rate of the polycarbonate is equal to or less than 15 cm$^3$/10 min, or equal to or less than 12 cm$^3$/10 min, preferably equal to or less than 6 cm$^3$/10 min, measured at 300° C. with a 1.2 kg load in accordance with ISO1133.

A method for producing the above described panel includes shaping the polymer composition at a temperature of 310° C. to 360° C., or 320° C. to 350° C., preferably 320° C. to 350° C., to obtain the substrate and applying the hardcoat layer on the surface of the substrate.

The above described and other features are exemplified by the following figures, detailed description, claims, and examples.

The following figures are exemplary embodiments wherein the like elements are numbered alike.

FIG. 2B is a cross-sectional view A-A of the panel illustrated in FIG. 2A.

FIG. 2C is a cross-sectional view B-B of the panel illustrated in FIG. 2A.

FIG. 2D is a cross-sectional view of another panel.

FIG. 3 is a cross-sectional view of an embodiment of a front end of a vehicle.

Figure 1:
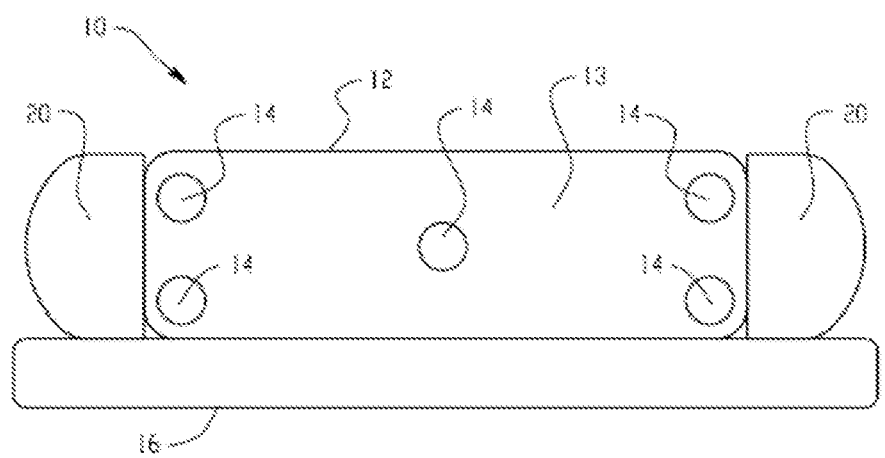
FIG. 1 is a schematic illustration of the front view of an embodiment of an integrated structure for a vehicle front end.

The above described and other features are exemplified by the following detailed description, examples, and claims.

Disclosed herein are panels (e.g., front panels or safety glazing panels) for vehicles, integrated structures for vehicles, and methods for producing the panels. The panels, which include a hardcoat layer and a polycarbonate with a melt volume rate (MVR) of equal to or less than 12 cubic centimeters per ten minutes (cm$^3$/10 min), meet at least one of the following CTQ characteristics: visible light transmission (T%) equal to or greater than 40%, as measured in accordance to ASTM D1003-00; UV resistance meeting the requirements for color stability, transmission, and haze of SAE Standard J576-10; scratch resistance as shown by a haze equal to or less than 30% after abrasion of the hardcoat layer for 500 cycles at 500 gram, as measured with CS-10F in accordance with ASTMD1044-13 (i.e., Taber abrasion); pedestrian impact meeting the lower leg and upper leg requirements of European Enhanced Vehicle-Safety Committee (EEVC), European New Car Assessment Programme (Euro NCAP), Vehicle Regulations under the United Nations Economic Commission for Europe (UNECE), or ISO 11096; low-speed vehicle damageability meeting the requirements of 49 C.F.R. Part 581, International Regulation ECE42, Insurance Institute for Highway Safety (IIHS) or RCAR; chemical resistance meeting the requirements of the Consolidated Resolution on the Construction of Vehicles (ECE/TRANS/WP.29/2008/92) or the Federal Motor Vehicle Safety Standards (49 C.F.R. Part 571). As used herein, MVR refers to the combined MVR of the polycarbonate in the polymer composition. In other words, if there is one polycarbonate in the composition, it is the MVR of that polycarbonate. If there is more than one polycarbonate in the polymer composition, the MVR is the MVR of the blend of polycarbonates.

Prior attempts to produce large plastic components (e.g., having a width equal to or greater than 450 mm or a height equal to or greater than 300 mm), such as panels (e.g., front panels), for vehicles meeting the above described CTQ characteristics suffered from molding problems. In particular, due to the large size of the component, a minimum flow of the polymer (i.e., MVR greater than 15 cm$^3$/10 min) and advanced processing techniques (such as compression molding, multiple gating, or sequential gating during molding) were required. Upon application of a hardcoat layer onto such polymers, the impact properties (e.g., as indicated by puncture energy) and ductility (which correlates to high energy absorption) were reduced to an extent that resulted in brittle failure (e.g., break at low puncture energies (such as less than 20 Joules (J) for a 3.2 mm thick plaque), low energy absorption, or sharp edges resulting from break), which was unsatisfactory for CTQ characteristics such as pedestrian impact requirements.

For instance, compression molding reduces the inner stress of the molded panels, thereby reducing their impact properties and ductility. Annealing or applying a hardcoat layer to the polymer also reduces the inner stress of the polymer, resulting in reduced impact properties and ductility. Though flow promoters previously could be used to increase the flow of polymers with lower flow, the flow promoters caused a decrease in impact properties. Impact modifiers such as rubber particles or polyesters could be blended to improve the impact properties of the polymers, but these materials caused a loss of visible light transmission.

Surprisingly, it was found that polycarbonates with lower flow (e.g., MVR equal to or less than 15 cm$^3$/10 min) can be used to produce large panels meeting the aforementioned CTQ characteristics. Desirably, panels could be produced with thinner substrates having a thickness equal to or less than 5 mm (meeting thickness and weight CTQ characteristics requirements) by increasing the flow of the polymer compositions including polycarbonate used to form the substrate via shaping the polymer compositions at a higher temperature of 310° C. to 360° C., or 320° C. to 350° C., preferably 325° C. to 350° C. In addition, the polymer compositions used for producing the present components possess a melt stability which aids in avoiding loss of molecular weight during molding at these higher temperatures (e.g., due to degradation, which can result in a reduction of impact properties).

Furthermore, as the present components are not exposed to high temperatures (e.g., greater than 100° C.) upon assembly onto a vehicle, they can comprise different polymer compositions that can be less heat resistant and more ductile. For instance, the panels can be produced by a 2-component (e.g., 2K) molding process, where a first polymer composition and a second polymer composition can be molded adjacent to one another to provide different properties in each of the resultant layers of the panel.

Moreover, the components can be easily assembled onto a vehicle despite narrow tolerances for assembly, as they exhibit high dimensional stability and low warpage (e.g., equal to or less than 3% over a 1,000 mm length). Dimensional stability or warpage of a component can be determined by evaluating the differences between the component dimensions and the mold cavity dimensions. The dimensional stability and warpage are calculated by subtracting the dimension of the component from the corresponding dimension of the mold cavity and dividing by the latter.

These components present further advantages as they can integrate additional functions. For instance, since the function of a grill is not required, new functions such as lighting functions, display functions, camera functions, and sensor functions can be provided on the vehicle at the front panel.

A component, such as a panel for a vehicle, can include a substrate and a hardcoat layer on a surface of the substrate. A noted above, the panel includes a first portion, wherein the substrate has a visible light transmission equal to or greater than 40%, or equal to or greater than 60%, preferably equal to or greater than 75%, more preferably equal to or greater than 88%. As used herein, "visible light transmission" or "transmission" is measured in accordance with ASTM D1003-00, at the component thickness, using Procedure A, on a HAZE-GUARD DUAL from BYK-Gardner with an integrating sphere (0°/diffuse geometry) and a spectral sensitivity conforming to the International Commission on Illumination (CIE) standard spectral value under standard lamp D65.

Desirably, the substrate can comprise a polymer composition including polycarbonate that meets the required CTQ characteristics. A melt volume rate of the polycarbonate (i.e., the combined MVR of the one or more polycarbonates in the composition) can be equal to or less than 15 cm$^3$/10 min, or equal to or less than 12 cm$^3$/10 min, preferably equal to or less than 10 cm$^3$/10 min, equal to or less than 6 cm$^3$/10 min. For instance, the melt volume rate of the polycarbonate can be 3 cm$^3$/10 min to 15 cm$^3$/10 min, or 3 cm$^3$/10 min to 12 cm$^3$/10 min, preferably 6 cm$^3$/10 min to 12 cm$^3$/10 min. As used herein, "melt volume rate" (MVR) is measured at 300° C. with a 1.2 kg load and a dwell time of 300 seconds in accordance with ISO1133. MVR measures the rate of extrusion of a thermoplastic polymer through an orifice at a prescribed temperature and load. Combinations of polymers of different flow properties can be used to achieve the overall desired flow property.

A width of the panel is equal to or greater than 450 mm, or 450 mm to 1,400 mm, preferably 500 mm to 1,200 mm, and a height of the panel is equal to or greater than 200 mm, or 200 mm to 1,000 mm, preferably 300 mm to 600 mm. For instance, the width of the panel can span the width of the vehicle, or span 50% to 90% of the width of the vehicle.

Desirably, a thickness of the panel can be equal to or less than 5 mm (e.g., 0.5 mm to 5 mm), or equal to or less than 4.5 mm (e.g., 1 mm to 4.5 mm), preferably 1.5 mm to 4 mm, more preferably 2 mm to 4 mm. Even at such a thickness, the panel can meet the required CTQ characteristics (e.g., pedestrian impact) for vehicles, while also spanning the width and the height as described herein.

Optionally, the component can have different properties in different areas. This can be accomplished with additives and/or additional layer(s). For instance, to provide different properties at different portions of the panel, a panel can include two or more layers. The substrate can have a higher visible light transmission than a second layer on a surface of the substrate that has a lower visible light transmission such that the aesthetics of the panel (e.g., when viewing the panel as a whole as the vehicle front-facing surface) can be modified by the second layer (e.g., to hide functional devices from view).

For instance, the panel can include a second layer on a surface of the substrate opposite the hardcoat layer, and wherein the second layer comprises a second polymer composition, and wherein the second layer is discontinuous over the substrate, and wherein a visible light transmission of the second layer is different (e.g., less) than a visible light transmission of the first portion of the panel. Thus, a panel can be provided with a first portion, e.g., where lighting functions could be provided, and a second portion, e.g., where visible light can be blocked or a sensor can be hidden from view, and yet transmission of infrared light can occur. As such, the first portion can be transparent and the second portion can be opaque.

As used herein, unless specified otherwise, "transparent" can refer to a material property comprising at least one of: a visible light transmission equal to or greater than 40%; and a haze equal to or less than 30.0%. As used herein, unless specified otherwise, "haze" is measured in accordance with ASTM D1003-00, at the component thickness, using Procedure A, on a HAZE-GUARD DUAL from BYK-Gardner with an integrating sphere (0°/diffuse geometry) and a spectral sensitivity conforming to the International Commission on Illumination (CIE) standard spectral value under standard lamp D65. As used herein, "opaque" can refer to a material property comprising a visible light transmission less than 10%.

Desirably, a haze of the first portion is equal to or less than 30%, or equal to or less than 20%, preferably equal to or less than 10%, more preferably equal to or less than 5.0%, still more preferably, equal to or less than 1.5%, yet still more preferably equal to or less than 1.0%.

For instance, a visible light transmission of the first portion can be 60% to 91% and a thickness of the panel can be 2 mm to 4 mm. In another instance, a haze of the first portion can be equal to or less than 20%, and a thickness of the panel can be 1.5 mm to 4 mm.

Desirably, the panel further includes a second portion and at least one of: a visible light transmission of the second portion less than 40%, or equal to or less than 10%, preferably equal to or less than 1%, more preferably equal to or less than 0.1%; an "L*" value of the second portion equal to or less than 10.0, or equal to or less than 7.5, preferably equal to or less than 5.0; an "a*" value of the second portion of −2 to 2, or −1 to 1; and a "b*" value of the second portion of −2 to 2, or −1 to 1. As used herein "L*" or "lightness", "a*" or "color opponent green-red", and "b*" or "color opponent blue-yellow" are measured using CIE illuminant D65 and 10° observer specular component excluded on an X rite i7 spectrophotometer in accordance with ASTM E308-15 (Standard Practice for Computing the Colors of Objects by using the CIE System).

Desirably, the second portion can be at least partially transparent to infrared light (i.e., transmission of infrared light can occur) such that infrared sensors can be hidden from view, but yet transmit infrared light through the second portion.

As noted above, the panel can be a single layer or multiple layers. A panel can include the substrate and a second layer comprising a second polymer composition. The substrate can include a first polymer composition with higher impact properties than the second polymer composition. For instance, a first puncture energy of the first polymer composition can be greater than a second puncture energy of the second polymer composition. Desirably, a first ductility of the first polymer composition can be greater than a second ductility of the second polymer composition.

The substrate (e.g., the first polymer composition) can include polycarbonate. The substrate can include a blend of polycarbonate and at least one of polypropylene and poly (methyl methacrylate). Desirably, the substrate (e.g., at least one of the first polymer composition and the second polymer composition) comprises a polycarbonate copolymer, a linear homopolymer containing bisphenol A carbonate units, a poly(carbonate-siloxane) copolymer comprising bisphenol A carbonate units and siloxane units, poly(aliphatic ester-carbonate)s, a blend of at least one of the foregoing with an impact modifier, or a combination of at least one of the foregoing.

The second polymer composition can include at least one of a polycarbonate and a polycarbonate blend, preferably a blend of polycarbonate and acrylonitrile-butadiene-styrene, a blend of polycarbonate and polybutylene terephthalate, or a combination comprising at least one of the foregoing. For instance, the first polymer composition can include a polycarbonate copolymer, a linear homopolymer containing bisphenol A carbonate units, a poly(carbonate-siloxane) copolymer comprising bisphenol A carbonate units and siloxane units, poly(aliphatic ester-carbonate)s, a blend of at least one of the foregoing with an impact modifier, or a combination of at least one of the foregoing and the second polymer composition can include a polycarbonate blend, preferably a blend of polycarbonate and acrylonitrile-butadiene-styrene, a blend of polycarbonate and polybutylene terephthalate, or a combination comprising at least one of the foregoing.

The second polymer composition can include a filler such as the fillers described herein or pigments that block light in the visible wavelength spectrum, yet allow transmission of light in the infrared wavelength spectrum. For instance, the second polymer can include a polycarbonate copolymer and carbon black.

The present panel can comprise at least one of: a ductility of 80% to 100%, or 90% to 100%, preferably 95% to 100%, measured at 23° C.; and a ductility of 80% to 100%, or 90% to 100%, preferably 95% to 100%, measured at −25° C. A puncture energy of the panel can be equal to or greater than 40 Joules, or equal to or greater than 50 Joules, preferably equal to or greater than 60 Joules. Unless otherwise indicated, "ductility" is measured at 23° C. in accordance with ISO6603-2-00. As used herein, "puncture energy" is measured at 23° C. (unless otherwise specified) with a ball speed of 4.4 meters per second (m/s) and the hardcoat layer facing upwards in accordance with ISO6603-2-00.

Desirably, the panel includes a device (e.g., electronic device) accommodating portion comprising at least one of a sensor accommodating portion, a light accommodating portion (e.g., a headlamp accommodating portion or a LED light accommodating portion), a camera accommodating portion, a display accommodating portion, a receiver accommodating portion, a reflector accommodating portion, and a transmitter accommodating portion. As used herein, "device accommodating portion" refers to a design element in or on the component that allows a device to be placed, mounted, attached or adhered proximate to, adjacent to, or incorporated into the panel. The device accommodating portion can be in at least one of the first portion and the second portion. For instance, the device accommodating portion can be 1) opaque and allow transmission of infrared light, 2) partially transparent and partially opaque (e.g., includes a light diffuser portion), or 3) transparent.

Desirably, the device accommodating portion includes a cavity into which a device can be positioned. The device accommodating portion can include connectors, which can be used to connect the front panel to a front end or to the body of the vehicle. The connectors can be screw fittings, clips, welding bond areas, laser welding areas, adhesive areas (e.g., glue areas), or a combination comprising at least one of the foregoing.

"Polycarbonate" as used herein means a polymer or copolymer having repeating structural carbonate units of formula (1)

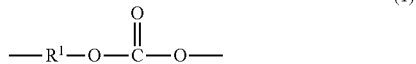

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3).

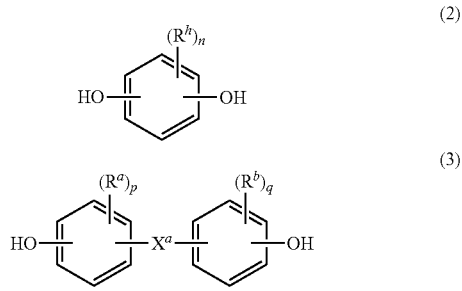

In formula (2), each $R^h$ is independently a halogen atom, for instance bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. For instance, p and q can each be 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for instance, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For instance, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Bisphenol compounds can include 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis (hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Specific dihydroxy compounds include resorcinol, 2,2-bis (4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxyphenyl)-3,3,5-trimethylcyclohexane (isophorone bisphenol).

"Polycarbonate" as used herein also includes copolymers comprising carbonate units and ester units ("poly(ester-carbonate)s", also known as polyester-polycarbonates). Poly (ester-carbonate)s further contain, in addition to recurring carbonate chain units of formula (1), repeating ester units of formula (4)

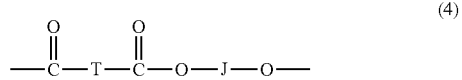

wherein J is a divalent group derived from a dihydroxy compound (which includes a reactive derivative thereof), and can be, for instance, a $C_{2-10}$ alkylene, a $C_{6-20}$ cycloalkylene, a $C_{6-20}$ arylene, or a polyoxyalkylene group in which the alkylene groups contain 2 to 6 carbon atoms, specifically, 2, 3, or 4 carbon atoms; and T is a divalent group derived from a dicarboxylic acid (which includes a reactive derivative thereof), and can be, for instance, a $C_{2-20}$ alkylene, a $C_{6-20}$ cycloalkylene, or a $C_{6-20}$ arylene. Copolyesters containing a combination of different T or J groups can be used. The polyester units can be branched or linear.

Specific dihydroxy compounds include aromatic dihydroxy compounds of formula (2) (e.g., resorcinol), bisphenols of formula (3) (e.g., bisphenol A), a $C_{1-8}$ aliphatic diol such as ethane diol, n-propane diol, i-propane diol, 1,4-butane diol, 1,6-cyclohexane diol, 1,6-hydroxymethylcyclohexane, or a combination comprising at least one of the foregoing dihydroxy compounds. Aliphatic dicarboxylic acids that can be used include $C_{6-20}$ aliphatic dicarboxylic acids (which includes the terminal carboxyl groups), specifically linear $C_{8-12}$ aliphatic dicarboxylic acid such as decanedioic acid (sebacic acid); and alpha, omega-$C_{12}$ dicarboxylic acids such as dodecanedioic acid (DDDA). Aromatic dicarboxylic acids that can be used include terephthalic acid, isophthalic acid, naphthalene dicarboxylic acid, 1,6-cyclohexane dicarboxylic acid, or a combination comprising at least one of the foregoing acids. A combination of isophthalic acid and terephthalic acid wherein the weight ratio of isophthalic acid to terephthalic acid is 91:9 to 2:98 can be used.

Specific ester units include ethylene terephthalate units, n-propylene terephthalate units, n-butylene terephthalate units, ester units derived from isophthalic acid, terephthalic acid, and resorcinol (ITR ester units), and ester units derived from sebacic acid and bisphenol A. The molar ratio of ester units to carbonate units in the poly(ester-carbonate)s can vary broadly, for instance 1:99 to 99:1, specifically, 10:90 to 90:10, more specifically, 25:75 to 75:25, or from 2:98 to 15:85. The molar ratio of ester units to carbonate units in the poly(ester-carbonate)s can vary from 1:99 to 30: 70, specifically 2:98 to 25:75, more specifically 3:97 to 20:80, or from 5:95 to 15:85.

Desirably, the polycarbonate can be a linear homopolymer containing bisphenol A carbonate units (BPA-PC), commercially available under the trade name LEXAN™ from SABIC; or a branched bisphenol A homopolycarbonate produced via interfacial polymerization, containing 3 mole % 1,1,1-tris(4-hydroxyphenyl)ethane (THPE) branching agent.

The polycarbonate can be a poly(carbonate-siloxane) copolymer comprising bisphenol A carbonate units and siloxane units, for instance blocks containing 5 to 200 dimethylsiloxane units, such as those commercially available under the trade name EXL™ from SABIC.

Poly(aliphatic ester-carbonate)s can be used, such as those comprising bisphenol A carbonate units and sebacic acid-bisphenol A ester units, such as those commercially available under the trade name LEXAN™ HFD from SABIC.

The polycarbonate can be of a particular purity level. For instance, the polycarbonate can be a high purity polycarbonate characterized as having a purity of equal to or greater than 99.65 weight % (wt %), or 99.65 wt % to 99.70 wt %, and which contains less than 2 parts per million by weight (ppm) sulfur, based on the total weight of the polycarbonate, although other purity criteria could be applied. The polycarbonate can be produced from a para, para-bisphenol A polymer having a purity equal to or greater than 99.65 wt % and which contains less than 2 ppm sulfur, based on the total weight of the polycarbonate. Sulfur levels are measured, for instance, by a Total Sulfur Analysis based on combustion and coulometric detection.

Desirably, the polycarbonate can be copolymers and bisphenol A homopolycarbonates with very low residual amounts of volatile impurities. For instance, chlorobenzene and other aromatic chlorine compounds can be present in the polycarbonate in an amount equal to or less than 10 ppm, or equal to or less than 5 ppm, preferably equal to or less than 2 ppm, based on the total weight of the polycarbonate; dichloromethane can be present in the polycarbonate in an amount equal to or less than 1 ppm, or equal to or less than 0.5 ppm, based on the total weight of the polycarbonate; monohydric phenols, such as phenol, tert-butylphenol, and cumylphenol, can be present in the polycarbonate in an amount equal to or less than 15 ppm, or equal to or less than 5 ppm, preferably equal to or less than 2 ppm, based on the total weight of the polycarbonate; and alkanes can be present in the polycarbonate in an amount equal to or less than 10 ppm, or equal to or less than 5 ppm, based on the total weight of the polycarbonate.

The polycarbonate can include residual amounts of: carbon tetrachloride in an amount equal to or less than 0.01 ppm, based on the total weight of the polycarbonate; diaryl carbonates, such as diphenyl carbonate and di-tert-butyl phenolcarbonate, in an amount equal to or less than 5 ppm, or equal to or less than 2 ppm, based on the total weight of the polycarbonate; bisphenol A and other bisphenols in an amount equal to or less than 5 ppm, or equal to or less than 2 ppm, preferably equal to or less than 0.5 ppm, based on the total weight of the polycarbonate; sodium and other alkali metals and alkaline earth metals in an amount equal to or less than 0.05 ppm, based on the total weight of the polycarbonate; cresols in an amount equal to or less than 1 ppm, or equal to or less than 0.2 ppm, based on the total weight of the polycarbonate; phenolic OH groups in an amount equal to or less than 300 ppm, or equal to or less than 200 ppm, preferably equal to or less than 100 ppm, based on the total weight of the polycarbonate; alkaline earth metals in an amount equal to or less than 0.1 ppm, or equal to or less than 0.05 ppm, based on the total weight of the polycarbonate; pyridine in an amount equal to or less than 1 ppm, or equal to or less than 0.1 ppm, based on the total weight of the polycarbonate; nonhalogenated aromatic compounds such as xylene and toluene in an amount equal to or less than 10 ppm, equal to or less than 5 ppm, based on the total weight of the polycarbonate.

Polycarbonates can be manufactured by processes such as interfacial polymerization and melt polymerization, which are known, and are described, for instance, in WO 2013/175448 A1 and WO 2014/072923 A1. An end-capping agent (also referred to as a chain stopper agent or chain terminating agent) can be included during polymerization to provide end groups, for instance monocyclic phenols such as phenol, p-cyanophenol, and $C_1$-$C_{22}$ alkyl-substituted phenols such as p-cumyl-phenol, resorcinol monobenzoate, and p-and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. Branched polycarbonate blocks can be prepared by adding a branching agent during polymerization, for instance trimellitic acid, trimellitic anhydride, trimellitic trichloride, tris-p-hydroxyphenylethane, isatin-bis-phenol, tris-phenol TC (1,3,5-tris ((p-hydroxyphenyl)isopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 wt % to 2.0 wt %.

Combinations comprising linear polycarbonates and branched polycarbonates can be used.

The polycarbonates can have a weight average molecular weight (Mw) of 10,000 Daltons to 100,000 Daltons, or 15,000 Daltons to 50,000 Daltons, preferably 17,000 Daltons to 35,000 Daltons, as measured by gel permeation chromatography (GPC), using a crosslinked styrene-divinylbenzene column and calibrated to bisphenol A homopolycarbonate references. GPC samples are prepared at a concentration of 1 milligram per milliliter (ml), and are eluted at a flow rate of 1.5 ml per minute.

Desirably, the polymer composition further comprises an acid stabilizer comprising a sulfonic acid or ester thereof, an organophosphorous acid or ester thereof, or a combination comprising at least one of the foregoing, preferably n-butyl tosylate (BuTos).

The sulfonic acid ester can comprise an organosulfonic acid stabilizer of the formula:

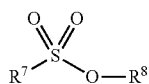

wherein each $R^7$ is independently a $C_{1-30}$ alkyl, $C_{6-30}$ aryl, $C_{7-30}$ alkylarylene, $C_{7-30}$ arylalkylene, or a polymer unit derived from a $C_{2-32}$ ethylenically unsaturated aromatic sulfonic acid or its ester, and $R^8$ is hydrogen $C_{1-24}$ alkyl, or a group of the formula —S(=O)$_2$—$R^7$ wherein $R^7$ is a $C_{6-12}$ aryl or $C_{7-24}$ alkylarylene. The sulfonic acid can comprise an alkylbenzene sulfonic acid, a polystyrene sulfonic acid, or a p-toluene sulfonic acid anhydride. Desirably, the sulfonic acid can comprise p-toluene sulfonic acid or butyl p-toluenesulfonate (i.e., n-butyl tosylate). The sulfonic acid or ester thereof can be present in the polymer composition an amount of 0.5 ppm to 5 ppm, based on the total weight of the polymer composition.

The organophosphorous acid or ester thereof can include phosphorous acid, phosphoric acid, phosphite, phosphine, phosphonite compound, or a combination comprising at least one of the foregoing.

Without being bound to any particular theory, the sulfonic acid or ester thereof, the organophosphorous acid or ester thereof, or a combination comprising at least one of the foregoing contributes to stabilizing a UV absorbing additive as described herein in the polymer composition, preventing or minimizing binding of the UV absorbing additive to a polycarbonate chain when subjected to the high temperatures of the step of shaping described herein.

Desirably, the polymer composition can further comprise a heat stabilizer and an acid stabilizer. The heat stabilizer can stabilize the polymer composition by improving color stability upon heat processing. The heat stabilizer can include at least one organophosphorous compound, including but not limited to a phosphite, phosphine or phosphonite compound. The heat stabilizer can include tris-(2,4-di-tert-butylphenyl) phosphite (e.g., IRGAFOS™ 168, commercially available from BASF) (IRG), triphenylphosphine (TPP), tridecylphosphite (TDP), tetrakis(2,4-di-tert-butylphenyl)-4,4-diphenyldiphosphonite) (PEPQ), bis (2,4-dicumylphenyl) pentaerythritol diphosphite (e.g., Doverphos S-9228, commercially available from Dover Chemical) (DP), diphenyl monodecyl phosphite (DPDP), or a combination comprising at least one of the foregoing.

The heat stabilizer can be present in the polymer composition in an amount of 0.01 wt % to 0.1 wt %, or 0.01 wt % to 0.5 wt %, preferably 0.01 wt % to 0.1 wt %, based on the total weight of the polymer composition.

Light stabilizers or ultraviolet light (UV) absorbing additives, also referred to as UV stabilizers, can also be present in the polymer composition. UV absorbing additives include hydroxybenzophenones; hydroxybenzotriazoles; hydroxybenzotriazines; cyanoacrylates; oxanilides; benzoxazinones; aryl salicylates; monoesters of diphenols such as resorcinol monobenzoate; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); poly[(6-morpholino-s-triazine-2,4-diyl)[2,2,6,6-tetramethyl-4-piperidyl) imino]-hexamethylene[(2,2,6,6-tetramethyl-4-piperidyl) imino], 2-hydroxy-4-octyloxybenzophenone (UVINUL™ 3008), 6-tert-butyl-2-(5-chloro-2H-benzotriazole-2-yl)-4-methylphenyl (UVINUL™ 3026), 2,4-di-tert-butyl-6-(5-chloro-2H-benzotriazole-2-yl)-phenol (UVINUL™ 3027), 2-(2H-benzotriazole-2-yl)-4,6-di-tert-pentylphenol (UVINUL™ 3028), 2-(2H-benzotriazole-2-yl)-4-(1,1,3,3-tetramethylbutyl)-phenol (UVINUL™ 3029), 1,3-bis[(2'cyano-3', 3'-diphenylacryloyl)oxy]-2,2-bis-{[(2'-cyano-3',3'-diphenylacryloyl)oxy]methyl}-propane (UVINUL™ 3030), 2-(2H-benzotriazole-2-yl)-4-methylphenol (UVINUL™ 3033), 2-(2H-benzotriazole-2-yl)-4,6-bis(1-methyl-1-phenyethyl)phenol (UVINUL™ 3034), ethyl-2-cyano-3,3-diphenylacrylate (UVINUL™ 3035), (2-ethylhexyl)-2-cyano-3,3-diphenylacrylate (UVINUL™ 3039), N,N'-bisformyl-N, N'-bis(2,2,6,6-tetramethyl-4-piperidinyl) hexamethylendiamine (UVINUL™ 4050H), bis-(2,2,6,6-tetramethyl-4-piperidyl)-sebacate (UVINUL™ 4077H), bis-(1,2,2,6,6-pentamethyl-4-piperidyl)-sebacate+methyl-(1,2, 2,6,6-pentamethyl-4-piperidyl)-sebacate (UVINUL™ 4092H) 1,3-bis[(2-cyano-3,3-diphenylacryloyl)oxy]-2,2-bis [[(2-cyano-3,3-diphenylacryloyl)oxy]methyl]propane (UVINUL™ 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; TINUVIN™ 234; nano-size inorganic materials such as titanium oxide, cerium oxide, and zinc oxide, all with particle size less than or equal to 100 nanometers; or the like, or combinations comprising at least one of the foregoing UV absorbers. UV absorbers can be used in amounts of 0.01 to 1 part by weight, based on 100 parts by weight of the polymer composition. UV absorbers that can be particularly useful with the polymer compositions disclosed herein include 2-(2H-benzotriazol-2-yl)-4-(1,1,3,3-tetramethyl-butyl)-phenol (e.g., CYASORB™ 5411 commercially available from Cytec Industries, Inc., Woodland Park, New Jersey) and 2,2'-(1,4-phenylene)bis(4H-3,1-benzoxazin-4-one) (e.g., CYASORB™ UV-3638, commercially available from Cytec Industries, Inc., Woodland Park, New Jersey), and combinations comprising at least one of the foregoing. The UV stabilizers can be present in an amount of 0.01 to 1 wt %, or 0.1 wt % to 0.5 wt %, preferably, 0.15 wt % to 0.4 wt %, based upon the total weight of the polymer composition.

The substrate of the panel can include equal to or greater than 60 wt %, or 70 wt %, preferably 80 wt %, more preferably 90 wt %, unbound UV absorbing additive, based upon the total amount of UV absorbing additive, upon shaping the polymer composition at the temperatures described herein.

The polymer composition can further include an impact modifier, with the proviso that the additive(s) are selected so as to not significantly adversely affect the desired properties of the thermoplastic composition, in particular transmission, haze, ductility, puncture energy, moldability (i.e., the ability to be molded), or a combination comprising at least one of the foregoing. Impact modifiers can include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR), silicone elastomers, styrene-butadiene-styrene (SBS), styrene-butadiene rubber (SBR), styrene-(ethylene-butene)-styrene (SEBS), acrylonitrile-butadiene-styrene (ABS), acrylonitrile-ethylene-propylene-diene-styrene (AES), styrene-isoprene-styrene (SIS), styrene-(ethylene-propylene)-styrene (SEPS), methyl methacrylate-butadiene-styrene (MBS), high rubber graft (HRG), and the like.

The polymer composition can include various additional additives (e.g., plasticizers, lubricants, mold release agents, colorants, dyes, fillers, flame retardants, light diffusers, epoxides) ordinarily incorporated into polymer compositions of this type, with the proviso that the additive(s) are selected so as to not significantly adversely affect the desired properties of the thermoplastic composition, in particular transmission, haze, ductility, puncture energy, moldability, or a combination comprising at least one of the foregoing. Since these properties can vary depending on the area of the component (e.g., opaque area or transparent area), various materials are possible. Combinations of additives can be used. Such additives can be mixed during the mixing of the components for forming the composition.

There is considerable overlap among plasticizers, lubricants, and mold release agents, which include, for instance, pentaerythritol tetrastearate (PETS), glycerol monostearate (GMS), glycerol tristearate (GTS), phthalic acid esters (e.g., octyl-4,5-epoxy-hexahydrophthalate), tris-(octoxycarbonyl-ethyl)isocyanurate, tristearin, di- or polyfunctional aromatic phosphates (e.g., resorcinol tetraphenyl diphosphate (RDP), the bis(diphenyl) phosphate of hydroquinone and the bis (diphenyl) phosphate of bisphenol A); poly-alpha-olefins; epoxidized soybean oil; silicones, including silicone oils (e.g., poly(dimethyl diphenyl siloxanes); esters, for instance, fatty acid esters (e.g., alkyl stearyl esters, such as, methyl stearate, stearyl stearate, and the like), waxes (e.g., beeswax, montan wax, paraffin wax, or the like), or combinations comprising at least one of the foregoing plasticizers, lubricants, and mold release agents. These are generally used in amounts of 0.01 wt % to 5 wt %, based on the total weight of the polymer composition.

Possible fillers or reinforcing agents include, for instance, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates), talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly (vinyl alcohol), as well combinations comprising at least one of the foregoing fillers or reinforcing agents. The fillers and reinforcing agents can be coated with a layer of metallic material to facilitate conductivity, or surface treated with silanes to improve adhesion and dispersion with the polymer composition. Fillers are used in amounts of 1 to 200 parts by weight, based on 100 parts by weight of the polymer composition.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 parts by weight, based on 100 parts by weight of the polymer composition, excluding any filler.

Colorants such as pigment or dye additives can also be present. Useful pigments can include, for instance, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.00001 wt % to 0.01 wt %, or 0.00002 wt % to 0.0010 wt %, preferably 0.00002 wt % to 0.0005 wt %, based on the total weight of the polymer composition.

Dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly $(C_{2-8})$ olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes;

aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.00001 wt % to 0.01 wt %, or 0.00002 wt % to 0.0010 wt %, or preferably 0.00002 wt % to 0.0005 wt. %, based on the total weight of the polymer composition.

Flame retardants include organic compounds that include phosphorus, bromine, or chlorine. Non-brominated and non-chlorinated phosphorus-containing flame retardants can be used in certain applications for regulatory reasons, for instance organic phosphates and organic compounds containing phosphorus-nitrogen bonds.

Flame retardant aromatic phosphates include triphenyl phosphate, tricresyl phosphate, isopropylated triphenyl phosphate, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, and 2-ethylhexyl diphenyl phosphate. Di- or polyfunctional aromatic phosphorus-containing compounds are also useful, for instance resorcinol tetraphenyl diphosphate (RDP), the bis(diphenyl) phosphate of hydroquinone and the bis(diphenyl) phosphate of bisphenol A, respectively, and their oligomeric and polymeric counterparts. Flame retardant compounds containing phosphorus-nitrogen bonds include phosphonitrilic chloride, phosphorus ester amides, phosphoric acid amides, phosphonic acid amides, phosphinic acid amides, and tris(aziridinyl) phosphine oxide. When used, phosphorus-containing flame retardants are present in amounts of 0.1 to 30 parts by weight, more specifically 1 to 20 parts by weight, based on 100 parts by weight of the total composition, excluding any filler.

Halogenated materials can also be used as flame retardants, for instance bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; and 2,2-bis-(3,5-dichloro-4-hydroxyphenyl)-propane 2,2 bis-(3-bromo-4-hydroxyphenyl)-propane. Other halogenated materials include 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, as well as oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are present in amounts of 1 parts by weight to 25 parts by weight, or 2 parts by weight to 20 parts by weight, based on 100 parts by weight of the polymer composition, excluding any filler.

Alternatively, the thermoplastic composition can be essentially free of chlorine and bromine. "Essentially free of chlorine and bromine" is defined as having a bromine or chlorine content of less than or equal to 100 parts ppm, or less than or equal to 75 ppm, preferably less than or equal to 50 ppm, based on the total weight of the polymer composition, excluding any filler.

Inorganic flame retardants can also be used, for instance salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoro-anion complexes such as $Li_3AlF_6$, $BaSiF_6$, $KBF_4$, $K_3AlF_6$, $KAlF_4$, $K_2SiF_6$, or $Na_3AlF_6$. When present, inorganic flame retardant salts are present in amounts of 0.01 to 10 parts by weight, more specifically 0.02 to 1 parts by weight, based on 100 parts by weight of the total composition, excluding any filler.

The hardcoat layer can be any material that does not significantly adversely affect the desired properties of the thermoplastic composition, in particular transmission, haze, ductility, puncture energy, moldability, or a combination comprising at least one of the foregoing, and is configured as a vehicle front-facing surface. The hardcoat layer can provide UV weathering resistance, chemical resistance, color stability, scratch resistance, or a combination comprising at least one of the foregoing. For instance, the hardcoat layer on a surface of the substrate can comprise at least one of: a taber abrasion comprising a haze equal to or less than 30%, or equal to or less than 20%, preferably equal to or less than 10% after 500 cycles at 500 grams, as measured with CS-10F in accordance ASTM D1044-13; an optical performance of the first portion comprising a haze of equal to or less than 30% (e.g., for a reflector accommodating portion), or equal to or less than 7% (e.g., for a light accommodating portion), as measured in accordance with ASTM D1003-00; and a decrease in transmission of equal to or less than 25% of the transmission of the substrate, as measured after conditions in accordance with lifetime test SAEJ576-10, at thicknesses of 1.6 mm, 2.3 mm, 3.2 mm, or 6.4 mm. The hardcoat layer can be at least one of a UV curing hardcoat layer and thermal curing hardcoat layer.

Desirably, the hardcoat layer can include at least one of a silicone, a polyurethane, an acrylate, and a metal oxide; preferably silicone.

Commercially available materials for the hardcoat layer can include SilFort UV hardcoat UVHC3000, SilFort UV hardcoat UVHC3000K1-50, SilFort hardcoat UVHC5000, Silfort hardcoat PHC587C (all commercially available from Momentive Performance Materials GmBH), SH-51 (commercially available from Stanley Electric Co.), Ltd.), UVT610V SRC hardcoat (commercially available from Red Spot Paint & Varnish Co., Inc.), UVT820V1 hardcoat (commercially available from Red Spot Paint & Varnish Co., Inc.), UVT820V2 hardcoat (commercially available from Red Spot Paint & Varnish Co., Inc.), UVT820V3 hardcoat (commercially available from Red Spot Paint & Varnish Co., Inc.), UVT820V8 hardcoat (commercially available from Red Spot Paint & Varnish Co., Inc.), KUV-1000 (commercially available from KCC Corporation), KUV-2000 (commercially available from KCC Corporation), KUV-3000 (commercially available from KCC Corporation), KUV-5000 (commercially available from KCC Corporation), KUV-6000 (commercially available from KCC Corporation), Acryking PH-710 (commercially available from Mitsubishi Rayon Co., Ltd.), Acryking PH-720 (commercially available from Mitsubishi Rayon Co., Ltd.), Acryking PH-800, (commercially available from Mitsubishi Rayon Co., Ltd.), FUJIHARD HH2540U (commercially available from Fujikura Kasei Co., Ltd.), or RayGloss 402 (commercially available from BASF Coatings GmbH). Commercially available materials for the hardcoat layer that can be a hardcoat first layer can include SilFort SHP470 or SilFort SHP401 (all commercially available from Momentive Performance Materials GmBH). Commercially available materials for the hardcoat layer that can be a hardcoat second layer can include SilFort AS4700 (commercially available from Momentive Performance Materials GmBH).

Desirably, a metal oxide coating can be applied to the substrate by chemical vapor deposition, plasma enhanced chemical vapor deposition, plasma deposition, or a combination comprising at least one of the foregoing.

Multiple hardcoat layers can be applied adjacent to one another or on opposite surfaces of the substrate. The hardcoat layers can act as a primer layer, a UV resistant layer (e.g., including UV absorbers), a top coat, a scratch resistant layer, or a combination comprising at least one of the foregoing. For instance, a first hardcoat layer with UV weathering resistance can be applied to a surface of the substrate and a second hardcoat layer with scratch resistance can be applied to the first hardcoat layer. Desirably, top coat includes a metal oxide hardcoat layer. Each hardcoat layer can have a thickness of 2 micrometers to 1,000 micrometers, or 2 micrometers to 500 micrometers, preferably 6 micrometers to 25 micrometers. For instance, a primer hardcoat layer can have a thickness of 2 micrometers to 1,000 micrometers, or 10 micrometers to 500 micrometers; a UV resistant hardcoat layer can have a thickness of 6 micrometers to 1,000 micrometers, or 8 micrometers to 25 micrometers; a top coat hardcoat layer can have a thickness of 2 micrometers to 1,000 micrometers, or 2 micrometers to 500 micrometers.

An integrated structure for a vehicle can include the above described panel attached to a vehicle component such as at least one of a bumper and a side rail. For instance, the panel can be molded, mechanically attached, screwed, clipped, adhered (e.g., glued), or welded to a bumper (e.g., via connectors), a side rail, or a combination comprising at least one of the foregoing.

A vehicle can include the above described panel or the above described integrated structure. The vehicle can be a passenger vehicle such as a car, a motorcycle, a bus, or a truck. The passenger vehicle can be a gasoline vehicle, a diesel vehicle, an electric vehicle, a hybrid electric vehicle, or a plug in hybrid electric vehicle.

Use of the above described polymer composition can include forming a substrate of a panel of a vehicle.

A method for producing the above described panel can include shaping the polymer composition at a temperature of 300° C. to 360° C., or 310° C. to 350° C., preferably 320° C. to 350° C., to obtain the substrate and applying the hardcoat layer on the surface of the substrate. Previously, shaping (e.g., molding) of polymer articles (e.g., polycarbonate articles) such as those used in automotive lighting lenses (e.g., headlamps) and other applications utilize lower temperatures, e.g., temperatures equal to or less than 310° C. in order to avoid molecular weight loss and an increase in yellowness. Molecular weight loss can result in loss of impact properties and brittle failure. While an increase in yellowness has a negative impact in the aesthetics and affects the color of the transmitted light. The present methods increase the temperature of the polymer composition during molding so that sufficient flow (low enough viscosity) of the polymer composition is present to fill the entire mold and/or to fill a mold cavity having relatively thinner dimensions. Desirably, the present methods limit molecular weight loss and color change during higher temperature molding, which facilitates an increase in flow of the polymer during molding.

The step of shaping the polymer composition can include at least one of extrusion (e.g., sheet extrusion), injection molding, thermoforming, and compression molding. The step of molding can further include multiple gating, sequential gating, or a combination comprising at least one of the forgoing. In one instance, the step of molding is devoid of multiple gating, sequential gating, or a combination comprising at least one of the forgoing. Desirably, the step of shaping comprises 2-component molding. The step of molding can comprise 2-component molding of a first polymer composition and a second polymer composition, wherein a substrate and a second layer, respectively, are formed and the second layer is discontinuous over the substrate, and wherein the substrate has a visible light transmission equal to or greater than 40% (e.g., is transparent) and the second layer has a visible light transmission less than 40% (e.g., is opaque).

In the method of producing the above described panel or the above described integrated structure, it can be desirable to increase the amount of time that the polymer composition is held at these elevated temperatures to ensure that the polymer composition is set in the mold. This can be desirable in multicomponent (e.g., 2-component or 2K) molding applications. For instance, the step of molding can be at temperature equal to or greater than 330° C. at a residence time equal to or greater than 10 minutes, or at temperature equal to or greater than 330° C. at a residence time equal to or greater than 12 minutes, or at a temperature equal to or greater than 330° C. at a residence time equal to or greater than 15 minutes, or at a temperature equal to or greater than 340° C. at a residence time equal to or greater than 6 minutes, or at a temperature equal to or greater than 340° C. at a residence time equal to or greater than 10 minutes, or at a temperature equal to or greater than 350° C. at a residence time equal to or greater than 6 minutes, or at a temperature equal to or greater than 350° C. at a residence time equal to or greater than 10 minutes, or at a temperature equal to or greater than 350° C. at a residence time equal to or greater than 15 minutes, or even at a temperature equal to or greater than 360° C. at a residence time equal to or greater than 3 minutes.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

As illustrated in FIG. 1, integrated structure 10 includes panel 12 and bumper 16 connected to panel 12. Panel 12 includes first portion 13 and sensor accommodating portions 14. The first portion 13 has a visible light transmission equal to or greater than 40%. Panel 12 can include two headlamp accommodating portions 20.

Figure 2A:
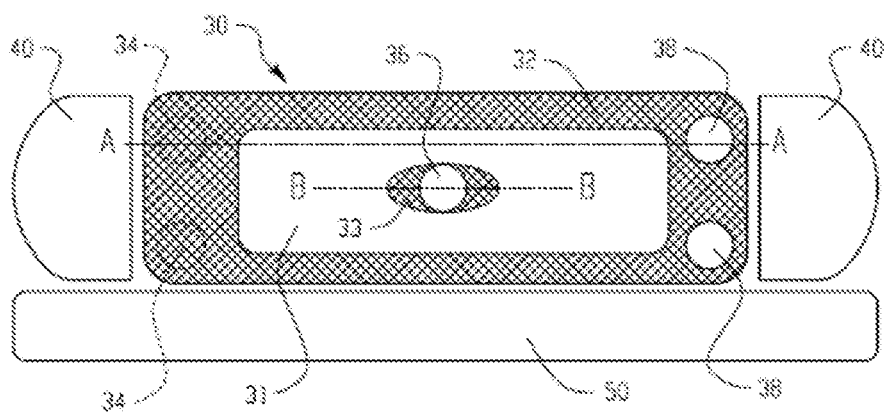
FIG. 2A is a schematic illustration of the front view of an embodiment of a panel for a vehicle front end.

As illustrated in FIG. 2A, panel 30 includes second portions 32, 33, first portion 31, sensor accommodating portions 34, 36, and camera accommodating portions 38. The second portions 32, 33 have a visible light transmission less than 40%. Panel 30 can be positioned between two headlamps 40 and above bumper 50.

As illustrated in FIG. 2B, panel 30 can include substrate 62, which is transparent and a second layer 64 that is opaque. Hardcoat layer 66 can be on a surface of substrate 62 distal second layer 64. Hardcoat layer 66 can include hardcoat first layer 68 and hardcoat second layer 69. Sensor 70 can be placed in sensor accommodating portion 34 such that, in use, sensor 70 is behind second portion 65 and not visible. Camera accommodating portion 38 can include a cavity 72 that is adjacent to substrate 62, which is transparent such that, in use, a camera (not shown) can be positioned in cavity 72 and at least a portion of the camera (e.g., a lens) can be viewed through the substrate 62.

As illustrated in FIG. 2C, sensor 74 can be placed in sensor accommodating portion 36 such that, in use, sensor 74 is behind light diffuser portion 76, which can diffuse light passing therethrough. Thus, sensor 74 can be partially visible in use.

As illustrated in FIG. 2D, sensor accommodating portions 84 and 88 can include connectors 80 for connecting the front panel to a vehicle.

As illustrated in FIG. 3, vehicle front 90 can include front panel 92 installed thereon. Front panel 92 can be below hood 94 and above bumper 96. Behind bumper 96 can be bumper bar 97 and behind front panel 92 can be front end 98.

The following examples are merely illustrative of the panels disclosed herein and are not intended to limit the scope hereof.

EXAMPLES

The following components listed in Table 1 are used in the examples. Unless specifically indicated otherwise, the amount of each component is in weight percent in the following examples, based on the total weight of the composition.

TABLE 1

| Acronym/ Name | Description | Source |
|---|---|---|
| PC1 | Linear Bisphenol A Polycarbonate, produced via interfacial polymerization, Mw of about 30,000 grams per mole (g/mol) as determined | SABIC |

TABLE 1-continued

| Acronym/ Name | Description | Source |
|---|---|---|
| | by GPC using polycarbonate standards, phenol end-capped (at least 98%) with an MVR at 300° C./1.2 kg, of 6 cm$^3$/10 min | |
| PC2 | Linear Bisphenol A Polycarbonate, produced via interfacial polymerization, Mw of about 21,800 g/mol as determined by GPC using polycarbonate standards, para-cumylphenyl (PCP) end-capped (at least 98%) with an MVR at 300° C./1.2 kg, of 25 cm$^3$/10 min | SABIC |
| IRGF | Tris-(2,4-di-tert-butylphenyl) phosphite (Cas. No. 31570-04-4); IRGAFOS ™ 168 | CIBA |
| IRGN | Octadecyl 3-(3,5-ditertbutyl-4-hydroxyphenyl) propionate; IRGANOX ™ 1076 (Cas. No. 2082-79-3) | BASF |
| PETS | Palmitic/Stearic Acid Ester of Dipenta/ Pentaerythritol (Cas. No. 115-83-3) | |
| UVS | 2-(2'-Hydroxy-5'-t-octylphenyl) benzo-triazole; UV5411 (Cas. No. 3147-75-9) | CYTEC |
| BuTos | Butyl p-toluenesulfonate (Cas. No. 778-28-9) | |
| HC | SilFort UV hardcoat UVHC3000 | MOMENTIVE |

Unless otherwise indicated, physical measurements were made using the tests and test methods described below. Unless indicated otherwise, all tests are the most recent version of the test in effect in the year 2010.

The BPA organic purity can be defined as 100 wt % minus the sum of known and unknown impurities detected using ultraviolet (UV) (see HPLC method in Nowakowska et al., Polish J. Appl. Chem., XI (3), 247-254 (1996)).

The puncture energy (i.e., energy at break) and the maximum force at break in multi axial impact (MAI) was measured at 23° C. (unless otherwise specified) on 3.2 mm thick plaques, with a ball speed of 4.4 m/s and the hardcoat layer facing upwards in accordance with ISO6603-2-00.

Colorimetric values (dE*, L*, a*, b*) were measured on 2.5 mm plaques using CIE illuminant D65 and 10° observer specular component excluded on an X rite i7 spectrophotometer in accordance with ASTM E308-15 (Standard Practice for Computing the Colors of Objects by using the CIE System).

Injection molded test specimens were molded in accordance with ASTM test methods.

The materials were dried at 120° C. for 2.5 hours before injection molding. All thermoplastic compositions except where indicated are compounded on a Werner & Pfleiderer co-rotating twin screw extruder (Length/Diameter (L/D) ratio=30/1, vacuum port located near die face). The twin-screw extruder had enough distributive and dispersive mixing elements to produce good mixing between the polymer compositions. The compositions are subsequently molded according to ISO 294 on an Engel-75 injection molding machine. The following temperature profiles were used: Zone 1/Zone 2/Zone 3/Nozzle=280/290/300/295° C. ("300° C. temperature profile") or 330° C./340° C./350° C./345° C. ("350° C. temperature profile"). The residence time of the material in the screw was controlled by the cooling of the injection molded plaques. The resulting residence times were from 3 to 15 minutes.

The hardcoat layer materials were filtered and applied on the plaque by flow coating. After coating, plaques were dried in air for 5 minutes and dried in a convection oven at 80° C. for 5 minutes. UV curing of the hardcoat layers was performed using a C211 Benchtop conveyor with a Fusion 1300 type H UV curing lamp (250 MW). To achieve curing, a UV dose of 1,200 MW/cm² was used. The dose per pass was adjusted by the conveyor belt speed. The lamp height was adjusted to provide a dose of UV light of 377 MW/cm². Three passes were done to achieve complete curing of the hardcoat layers. Using interferometry and the refractive indices of the substrates the hardcoat layers, and primer layers between the substrate and the hardcoat layer, the thickness of the hardcoat layer was measured to be in the specification range (8 micrometers to 15 micrometers).

EXAMPLES 1-4, AND COMPARATIVE EXAMPLES 1-3

For Examples (EX) 1-4 and Comparative Examples (CEX) 1-3, ten samples per example were produced using the polymer compositions listed in Table 2 molded with a 300° C. temperature profile for 6 minutes and a hardcoat layer comprising HC was applied. The samples were tested for puncture energy and ductility.

As shown in Table 2, for MVR 12 cm³/10 min and a plaque thickness of 1.6 mm, impact energy is low. However, at a plaque thickness of 2.2 and 3.2 mm, the samples are ductile and have sufficient impact energy. For example, the puncture energy of the examples having a thickness of 3.2 mm, EX1, EX4, and CEX3, uncoated, were all high. However, for the coated samples, the impact energy of CEX3 dropped very significantly and the sample became brittle (ductility of zero). EX1, EX4, and CEX3, all had a plaque thickness of 3.2 mm. However, they had different MVR. At MVR of less than 20 cm³/10 min (e.g., at less than or equal to MVR 15 cm³/10 min), impact energy remained high, and the samples were ductile. A similar trend can be seen with plaques having a thickness of 2.2 mm (EX3 and CEX2).

It is noted that at MVR 6 cm³/10 min, samples have good impact performance at a plaque thickness of 3.2 mm, but due to its low flow, such a material can be difficult to process for larger parts at this thickness (hence requiring the higher temperature molding).

TABLE 2

|  | EX1 | EX2 | EX3 | EX4 | CEX1 | CEX2 | CEX3 |
|---|---|---|---|---|---|---|---|
| MVR[1] (cm³/10 min) | 6 | 12 | 12 | 12 | 21 | 21 | 21 |
| PC1 (wt %) | 99.32 | 49.85 | 49.85 | 49.85 | 17.45 | 17.45 | 17.45 |
| PC2 (wt %) |  | 49.47 | 49.47 | 49.47 | 81.93 | 81.93 | 81.93 |
| UV stabilizer: UVS (wt %) | 0.15 | 0.3 | 0.3 | 0.3 | 0.3 | 0.3 | 0.3 |
| Heat stabilizer: IRGF (wt %) | 0.08 | 0.08 | 0.08 | 0.08 | 0.08 | 0.08 | 0.08 |
| Release agent: PETS (wt %) | 0.3 | 0.3 | 0.3 | 0.3 | 0.3 | 0.3 | 0.3 |
| Part thickness (mm) | 3.2 | 1.6 | 2.2 | 3.2 | 1.6 | 2.2 | 3.2 |
| Hardcoat | HC | HC | HC | HC | HC | HC | HC |
| Impact energy uncoated (J) | 152 | 71 | 113 | 153 | 57 | 101 | 144 |
| Impact energy[2] coated (J) | 108 | 34 | 62 | 108 | 32 | 18 | 17 |
| Ductility[3] coated (%) | 100 | 100 | 50 | 100 | 100 | 0 | 0 |

[1] MVR is the MVR of the polycarbonate (here a blend of polycarbonates) in the composition.
[2] measured at 23° C. with a ball speed of 4.4 m/s and the hardcoat layer facing upwards in accordance with IS06603-2-00
[3] measured at 23° C. in accordance with IS06603-2-00.

EX 5-11 and CEX 4

Five samples were produced per example and the results were averaged. The samples had a thicknesses of 3.2 mm (EX 5-7 and CEX4) and 5 mm (EX 8-11). The materials, molding conditions, and test results are summarized in Table 3.

TABLE 3

|  | EX5 | CEX4 | EX6 | EX7 | EX8 | EX9 | EX10 | EX11 |
|---|---|---|---|---|---|---|---|---|
| MVR[1] (cm³/10 min) | 6 | 6 | 6 | 6 | 6 | 6 | 6 | 6 |
| PC1 (wt %) | 96.13 | 96.13 | 94.13 | 94.13 | 94.33 | 94.33 | 92.33 | 92.33 |
| UV stabilizer: UVS (wt %) | 0.3 | 0.3 | 0.3 | 0.3 | 0.3 | 0.3 | 0.3 | 0.3 |
| Heat stabilizer: IRGF (wt %) | 0.05 | 0.05 | 0.05 | 0.05 | 0.05 | 0.05 | 0.05 | 0.05 |
| Release agent: PETS (wt %) | 0.3 | 0.3 | 0.3 | 0.3 | 0.3 | 0.3 | 0.3 | 0.3 |
| Anti-oxidant: IRGN (wt %) | 0.02 | 0.02 | 0.02 | 0.02 | 0.02 | 0.02 | 0.02 | 0.02 |
| Acid stabilizer: BuTos (ppm) | 0 | 0 | 2 | 2 | 0 | 0 | 2 | 2 |
| Molding conditions (15 min) | 350 | 360 | 350 | 360 | 350 | 360 | 350 | 360 |
| Part thickness (mm) | 3.2 | 3.2 | 3.2 | 3.2 | 5 | 5 | 5 | 5 |
| haze | 0.7 | 0.6 | 0.7 | 0.6 | 0.4 | 0.4 | 0.4 | 0.4 |
| % T | 90.4 | 90.3 | 90.5 | 90.4 | 89.8 | 89.4 | 90 | 89.7 |
| Hardcoat | HC | HC | HC | HC | HC | HC | HC | HC |
| Impact energy[2] coated (J) | 110 | 33 | 110 | 90 | 155 | 233 | 268 | 203 |
| Ductility[3] coated (%) | 100 | 25 | 100 | 80 | 100 | 100 | 100 | 100 |

[1] MVR is the MVR of the polycarbonate (here a single polycarbonate) in the composition.
[2] measured at 23° C. with a ball speed of 4.4 m/s and the hardcoat layer facing upwards in accordance with IS06603-2-00
[3] measured at 23° C. in accordance with IS06603-2-00

EX 12-14 and CEX 5-7

Five samples were produced per example and the results were averaged. The below examples illustrate the benefit of the acid stabilizer. Comparing EX14 to CEX5; the coated plaque has low impact energy and poor ductility with no acid stabilizer (CEX5), and high impact energy and good ductility with acid stabilizer (EX14) under the same processing conditions.

Also illustrated is the limitations of processing. CEX7 has low impact energy and is brittle when processed at 360° C. for 15 minutes. Actually, under these conditions, the acid stabilizer did not affect the results (compare CEX6 and CEX7).

TABLE 4

| | EX12 | CEX5 | CEX6 | EX13 | EX14 | CEX7 |
|---|---|---|---|---|---|---|
| MVR[1] (cm³/10 min) | 12 | 12 | 12 | 12 | 12 | 12 |
| PC1 (wt %) | 52 | 52 | 52 | 52 | 52 | 52 |
| PC2 (wt %) | 47.33 | 47.33 | 47.33 | 47.33 | 47.33 | 47.33 |
| UV stabilizer: UVS (wt %) | 0.3 | 0.3 | 0.3 | 0.3 | 0.3 | 0.3 |
| Heat stabilizer: IRGF (wt %) | 0.05 | 0.05 | 0.05 | 0.05 | 0.05 | 0.05 |
| Release agent: PETS (wt %) | 0.3 | 0.3 | 0.3 | 0.3 | 0.3 | 0.3 |
| Anti-oxidant: IRGN (wt %) | 0.02 | 0.02 | 0.02 | 0.02 | 0.02 | 0.02 |
| Acid stabilizer: BuTos (ppm) | 0 | 0 | 0 | 2 | 2 | 2 |
| Part thickness (mm) | 3.2 | 3.2 | 3.2 | 3.2 | 3.2 | 3.2 |
| haze | 0.7 | 0.6 | 0.7 | 0.4 | 0.6 | 0.6 |
| % T | 90.6 | 90.7 | 90.4 | 90.8 | 90.8 | 90.4 |
| molding condition ° C./min | 350/6 | 350/15 | 360/15 | 350/6 | 350/15 | 360/15 |
| Hardcoat | HC | HC | HC | HC | HC | HC |
| Impact energy[2] coated (J) | 77 | 35 | 11 | 82 | 122 | 8 |
| Ductility[3] coated (%) | 70 | 30 | 0 | 90 | 100 | 0 |

[1]MVR is the MVR of the polycarbonate (here a blend of polycarbonates) in the composition.

Thus, the effectiveness of the polymer composition to reduce loss of Mw after molding should improve the impact properties (e.g., higher puncture energy and ductility) after application of a hardcoat layer. Therefore, large panels (e.g., front panels) or integrated structures can be produced to meet the CTQ characteristics required for vehicles (e.g., transmission, pedestrian impact requirements, etc.).

This disclosure further encompasses the following aspects.

Aspect 1. A panel for a vehicle comprising: a substrate; and a hardcoat layer on a surface of the substrate configured as a vehicle front-facing surface, wherein the panel comprises a first portion having a visible light transmission equal to or greater than 40%, or equal to or greater than 60%, preferably equal to or greater than 75%, more preferably equal to or greater than 88%, measured in accordance with ASTM D1003-00, and wherein the substrate comprises a polymer composition comprising polycarbonate and having a melt volume rate, wherein (i) if the polymer composition comprises more than one polycarbonate, the melt volume rate is a melt volume rate of a blend of all of the polycarbonates, and (ii) if the polymer composition comprises one polycarbonate, the melt volume rate is a melt volume rate of the one polycarbonate; and wherein a melt volume rate of the polycarbonate is equal to or less than 15 cm³/10 min, or equal to or less than 12 cm³/10 min, preferably equal to or less than 6 cm³/10 min, measured at 300° C. with a 1.2 kg load in accordance with ISO1133, and wherein a width of the panel is equal to or greater than 450 mm, or 450 mm to 1,400 mm, preferably 500 mm to 1,200 mm. Desirably, a height of the panel is equal to or greater than 300 mm, or 300 mm to 1,000 mm, preferably 300 mm to 600 mm. A thickness of the panel can be equal to or less than 5 mm, or equal to or less than 4.5 mm, preferably 1.5 mm to 4.5 mm.

Aspect 2. The panel of Aspect 1, wherein a haze of the panel equal to or less than 30%, or equal to or less than 20%, preferably equal to or less than 10%, more preferably equal to or less than 10% after abrasion of the hardcoat layer for 500 cycles at 500 gram, as measured with CS-10F in accordance with ASTMD1044-13.

Aspect 3. The panel of any one or more of the preceding aspects, wherein the polymer composition further comprises an acid stabilizer comprising sulfonic acid or an ester thereof, preferably n-butyl tosylate; preferably wherein the acid stabilizer is present in the polymer composition in an amount of 0.5 ppm to 5 ppm, preferably 1 ppm to 3 ppm, based on the total weight of the polymer composition.

Aspect 4. The panel of any one or more of the preceding aspects, wherein the panel further comprises a second layer on a surface of the substrate opposite the hardcoat layer, and wherein the second layer comprises a second polymer composition, and wherein the second layer is discontinuous over the substrate, and wherein a visible light transmission of the second layer is less than a visible light transmission of the first portion of the panel.

Aspect 5. The panel of Aspect 4, wherein the second polymer composition comprises at least one of a polycarbonate and a polycarbonate blend, preferably a blend of polycarbonate and acrylonitrile-butadiene-styrene, a blend of polycarbonate and polybutylene terephthalate, or a combination comprising at least one of the foregoing.

Aspect 6. The panel of any one or more of the preceding aspects, wherein a haze of the first portion is equal to or less than 30%, or equal to or less than 20%, preferably equal to or less than 10%, more preferably equal to or less than 5.0%, still more preferably equal to or less than 1.5%, yet still more preferably equal to or less than 1.0%, measured in accordance with ASTM D1003-00.

Aspect 7. The panel of any one or more of the preceding aspects, further comprising a second portion, wherein at least one of: a visible light transmission of the second portion is less than 40%, or equal to or less than 10%, preferably equal to or less than 1%, more preferably equal to or less than 0.1%, measured in accordance with ASTM D1003-00; a L* value of the second portion is equal to or less than 10, or equal to or less than 7.5, preferably equal to or less than 5.0, measured using CIE illuminant D65 and 10° observer, specular component excluded on an X rite i7 spectrophotometer in accordance with ASTM E308-15 (Standard Practice for Computing the Colors of Objects by using the CIE System); an a* value of the second portion of −2 to 2, or −1 to 1, measured using CIE illuminant D65 and 10° observer specular component excluded on an X rite i7 spectrophotometer in accordance with ASTM E308-15 (Standard Practice for Computing the Colors of Objects by using the CIE System); and a b* value of the second portion is −2 to 2, or −1 to 1, measured using CIE illuminant D65 and 10° observer specular component excluded on an X rite i7 spectrophotometer in accordance with ASTM E308-15 (Standard Practice for Computing the Colors of Objects by using the CIE System).

Aspect 8. The panel of any one or more of the preceding aspects, wherein the hardcoat layer comprises at least one of a silicone, a polyurethane, an acrylate, and a metal oxide.

Aspect 9. The panel of any one or more of the preceding aspects, wherein at least one of: a ductility of the panel is 80% to 100%, or 90% to 100%, preferably 95% to 100%, measured at 23° C. in accordance with ISO6603-2-00; a ductility of the panel is 80% to 100%, or 90% to 100%, preferably 95% to 100%, measured at −25° C. in accordance with ISO6603-2-00; and a puncture energy of the panel is equal to or greater than 40 Joules, or equal to or greater than 50 Joules, preferably equal to or greater than 60 Joules, as measured with a ball speed of 4.4 m/s and the hardcoat layer facing upwards in accordance with ISO6603-2-00.

Aspect 10. The panel of any one or more of the preceding aspects, wherein the panel comprises an device accommodating portion comprising at least one of a sensor accommodating portion, a light accommodating portion, a camera accommodating portion, a display accommodating portion, a receiver accommodating portion, and a transmitter accommodating portion.

Aspect 11. The panel of any one or more of the preceding aspects, wherein the panel is a front panel for a vehicle.

Aspect 12. An integrated structure for a vehicle comprising: the panel of any one or more of the preceding aspects; and a bumper connected to the panel.

Aspect 13. A vehicle comprising the panel of any one or more of Aspects 1-11 or the integrated structure of Aspect 12.

Aspect 14. Use of a polymer composition to form a substrate of a panel of a vehicle, wherein the polymer composition comprises polycarbonate, and wherein a melt volume rate of the polycarbonate is equal to or less than 15 cm$^3$/10 min, or equal to or less than 12 cm$^3$/10 min, preferably equal to or less than 6 cm$^3$/10 min, measured at 300° C. with a 1.2 kg load in accordance with ISO1133.

Aspect 15. A method for producing the panel of any one or more of Aspects 1-11, comprising: shaping the polymer composition at a temperature of 310° C. to 360° C., or 320° C. to 350° C., preferably 320° C. to 350° C., to obtain the substrate; and applying the hardcoat layer on the surface of the substrate.

Aspect 16. A method for producing the panel of any one or more of Aspects 1-11, comprising: shaping the polymer composition at a temperature of 310° C. to 360° C., or 320° C. to 360° C., preferably 330° C. to 355° C., to obtain the substrate; and applying the hardcoat layer on the surface of the substrate.

Aspect 17. The method of any one or more of Aspects 15-16, wherein the step of shaping the polymer composition comprises extrusion, injection molding, compression molding, thermoforming, or a combination comprising at least one of the foregoing.

Aspect 18. A panel for a vehicle comprising: a substrate; and a hardcoat layer on a surface of the substrate configured as a vehicle front-facing surface, wherein the panel comprises a transparent portion and an opaque portion, and wherein the substrate comprises a polymer composition comprising polycarbonate, and wherein a melt volume rate of the polycarbonate is equal to or greater than 15 cm$^3$/10 min, or equal to or greater than 12 cm$^3$/10 min, preferably equal to or greater than 6 cm$^3$/10 min, measured at 300° C. with a 1.2 kg load in accordance with ISO1133, and wherein a thickness of the substrate is equal to or less than 5 mm, or equal to or less than 4.5 mm, preferably 1.5 mm to 4.5 mm, and wherein the visible light transmission of the transparent portion is equal to or greater than 40% and the difference in visible light transmission between the transparent portion and the opaque portion is equal to or greater than 20%, preferably equal to or greater than 30%.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

The singular forms "a," "an," and "the" include plural referents unless the context clearly dictates otherwise. "Or" means "and/or" unless clearly indicated otherwise by context. The terms "front", "back", "bottom", or "top" are used herein, unless otherwise noted, merely for convenience of description, and are not limited to any one position or spatial orientation. The terms "first," "second," and the like, "primary," "secondary," and the like, as used herein do not denote any order, quantity, or importance, but rather are used to distinguish one element from another.

The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group.

The suffix "(s)" is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this disclosure belongs. A "combination" is inclusive of blends, mixtures, alloys, reaction products, and the like.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A panel for a vehicle comprising:
   a substrate; and
   a hardcoat layer on a surface of the substrate configured as a vehicle front-facing surface,
   wherein the panel comprises
   a first portion having a visible light transmission equal to or greater than 40% measured in accordance with ASTM D1003-00,
   a second portion having a visible light transmission of less than 40%, measured in accordance with ASTM D1003-00, and a sensor accommodating portion in the second portion; and wherein the substrate comprises a polymer composition comprising polycarbonate;

wherein a melt volume rate of the polycarbonate is equal to or less than 15 cm$^3$/10 min, measured at 300° C. with a 1.2 kg load in accordance with ISO1133;

wherein a width of the panel is equal to or greater than 450 mm;

wherein a height of the panel is equal to or greater than 300 mm;

wherein a thickness of the panel is equal to or less than 5 mm; and wherein the panel is not a headlamp.

2. The panel of claim 1, wherein a haze of the panel is equal to or less than 30% after abrasion of the hardcoat layer for 500 cycles at 500 gram, as measured with CS-10F in accordance with ASTMD1044-13.

3. A panel for a vehicle comprising:
a substrate; and
a hardcoat layer on a surface of the substrate configured as a vehicle front-facing surface,
wherein the panel comprises
a first portion having a visible light transmission equal to or greater than 40% measured in accordance with ASTM D1003-00,
a second portion having a visible light transmission of less than 40%, measured in accordance with ASTM D1003-00, and
a sensor accommodating portion in the second portion; and
wherein the substrate comprises a polymer composition comprising polycarbonate and an acid stabilizer comprising sulfonic acid or an ester thereof
wherein a melt volume rate of the polycarbonate is equal to or less than 15 cm$_3$/10 min, measured at 300° C. with a 1.2 kg load in accordance with ISO1133;
wherein a width of the panel is equal to or greater than 450 mm;
wherein a height of the panel is equal to or greater than 300 mm;
wherein a thickness of the panel is equal to or less than 5 mm; and
wherein the panel is not a headlamp.

4. A panel for a vehicle comprising:
a substrate;
a hardcoat layer on a surface of the substrate configured as a vehicle front-facing surface; and
a second layer on a surface of the substrate opposite the hardcoat layer, wherein the second layer corresponds to a second portion of the panel, and
wherein the substrate comprises a first polymer composition comprising polycarbonate;
wherein the panel comprises
a first portion having a visible light transmission equal to or greater than 40% measured in accordance with ASTM D1003-00,
the second portion having a visible light transmission of less than 40%, measured in accordance with ASTM D1003-00, and
a sensor accommodating portion in the second portion;
wherein the second layer comprises a second polymer composition, and wherein the second layer is discontinuous over the substrate;
wherein a melt volume rate of the polycarbonate is equal to or less than 15 cm$^3$/10 min, measured at 300° C. with a 1.2 kg load in accordance with ISO1133;
wherein a width of the panel is equal to or greater than 450 mm;
wherein a height of the panel is equal to or greater than 300 mm;
wherein a thickness of the panel is equal to or less than 5 mm; and
wherein the panel is not a headlamp.

5. The panel of claim 4, wherein the second polymer composition comprises at least one of a polycarbonate or a polycarbonate blend.

6. The panel of claim 1, wherein a haze of the first portion is equal to or less than 30% measured in accordance with ASTM D1003-00.

7. The panel of claim 1, wherein:
a L* value of the second portion is equal to or less than 10 measured using CIE illuminant D65 and 10° observer, specular component excluded on an X rite i7 spectrophotometer in accordance with ASTM E308-15 (Standard Practice for Computing the Colors of Objects by using the CIE System);
an a* value of the second portion of −2 to 2 measured using CIE illuminant D65 and 10° observer specular component excluded on an X rite i7 spectrophotometer in accordance with ASTM E308-15 (Standard Practice for Computing the Colors of Objects by using the CIE System); and
a b* value of the second portion is −2 to 2 measured using CIE illuminant D65 and 10° observer specular component excluded on an X rite i7 spectrophotometer in accordance with ASTM E308-15 (Standard Practice for Computing the Colors of Objects by using the CIE System).

8. The panel of claim 1, wherein the hardcoat layer comprises at least one of a silicone, a polyurethane, an acrylate, and a metal oxide.

9. The panel of claim 1, wherein at least one of:
a ductility of the panel is 80% to 100% measured at 23° C. in accordance with ISO6603-2-00;
a ductility of the panel is 80% to 100% measured at −25° C. in accordance with ISO6603-2-00; or
a puncture energy of the panel is equal to or greater than 40 Joules as measured with a ball speed of 4.4 m/s and the hardcoat layer facing upwards in accordance with ISO6603-2-00.

10. The panel of claim 1, wherein the panel further comprises at least one of a light accommodating portion, a camera accommodating portion, a display accommodating portion, a receiver accommodating portion, or a transmitter accommodating portion.

11. An integrated structure for a vehicle comprising:
the panel of claim 1; and
a bumper connected to the panel.

12. A vehicle comprising the integrated structure of claim 11.

13. A method for producing the panel of claim 1, comprising:
shaping the polymer composition at a temperature of 310° C. to 360° C. to obtain the substrate; and
applying the hardcoat layer on the surface of the substrate.

14. The method of claim 13, wherein the step of shaping the polymer composition comprises at least one of extrusion, injection molding, compression molding, or thermoforming.

15. The method of claim 1, wherein a L* value of the second portion is equal to or less than 10 measured using CIE illuminant D65 and 10° observer, specular component excluded on an X rite i7 spectrophotometer in accordance with ASTM E308-15 (Standard Practice for Computing the Colors of Objects by using the CIE System).

16. The panel of claim 1, wherein an a* value of the second portion of −2 to 2 measured using CIE illuminant D65 and 10° observer specular component excluded on an X rite i7 spectrophotometer in accordance with ASTM E308-15 (Standard Practice for Computing the Colors of Objects by using the CIE System).

17. The panel of claim 1, wherein a b* value of the second portion is −2 to 2 measured using CIE illuminant D65 and 10° observer specular component excluded on an X rite i7 spectrophotometer in accordance with ASTM E308-15 (Standard Practice for Computing the Colors of Objects by using the CIE System).

18. The panel of claim 4, wherein a L* value of the second portion is equal to or less than 10 measured using CIE illuminant D65 and 10° observer, specular component excluded on an X rite i7 spectrophotometer in accordance with ASTM E308-15 (Standard Practice for Computing the Colors of Objects by using the CIE System).

19. The panel of claim 4, wherein an a* value of the second portion of −2 to 2 measured using CIE illuminant D65 and 10° observer specular component excluded on an X rite i7 spectrophotometer in accordance with ASTM E308-15 (Standard Practice for Computing the Colors of Objects by using the CIE System).

20. The panel of claim 4, wherein a b* value of the second portion is −2 to 2 measured using CIE illuminant D65 and 10° observer specular component excluded on an X rite i7 spectrophotometer in accordance with ASTM E308-15 (Standard Practice for Computing the Colors of Objects by using the CIE System).

* * * * *